(12) United States Patent
Tumblin et al.

(10) Patent No.: US 8,554,964 B2
(45) Date of Patent: Oct. 8, 2013

(54) METHOD AND APPARATUS FOR EFFICIENT SYNCHRONIZATION REQUEST RESPONSE

(75) Inventors: Christopher B. Tumblin, Broomfield, CO (US); Ryan P. McCallister, Lafayette, CO (US); Bradley E. Whitney, Erie, CO (US)

(73) Assignee: Oracle America, Inc., Redwood City, CA (US)

( * ) Notice: Subject to any disclaimer, the term of this patent is extended or adjusted under 35 U.S.C. 154(b) by 619 days.

(21) Appl. No.: 12/407,833

(22) Filed: Mar. 20, 2009

(65) Prior Publication Data

US 2010/0241770 A1 Sep. 23, 2010

(51) Int. Cl.
*G06F 3/00* (2006.01)
*G06F 5/00* (2006.01)
*G06F 3/06* (2006.01)
*G06F 12/00* (2006.01)
*G06F 13/00* (2006.01)
*G06F 13/28* (2006.01)

(52) U.S. Cl.
USPC ............... 710/52; 710/53; 710/57; 710/29; 711/4; 711/111; 711/112; 711/154; 711/161; 711/162

(58) Field of Classification Search
USPC .............. 710/29, 52, 53, 57; 711/4, 111, 112, 711/154, 161, 162
See application file for complete search history.

(56) References Cited

U.S. PATENT DOCUMENTS

| | | | |
|---|---|---|---|
| 4,792,898 A * | 12/1988 | McCarthy et al. | 711/118 |
| 6,571,304 B1 * | 5/2003 | Basham et al. | 710/53 |
| 6,954,834 B2 * | 10/2005 | Slater et al. | 711/162 |
| 7,218,468 B2 * | 5/2007 | Jauette et al. | 360/48 |
| 2004/0133737 A1 * | 7/2004 | Jaquette | 711/111 |

* cited by examiner

*Primary Examiner* — Henry Tsai
*Assistant Examiner* — Eric Oberly
(74) *Attorney, Agent, or Firm* — Brooks Kushman P.C.

(57) ABSTRACT

A data writing apparatus includes a tape drive, a buffer and non-volatile memory. When a synchronization request is received from a device sending data to be written to a tape, the apparatus is operable to copy data corresponding to the synchronization request from the buffer to the non-volatile memory. The data may be stored in the non-volatile memory until at least the time when the data which it is a copy of is written to the tape from the buffer.

18 Claims, 3 Drawing Sheets

METHOD AND APPARATUS FOR EFFICIENT SYNCHRONIZATION REQUEST RESPONSE

TECHNICAL FIELD

The illustrative embodiments generally relate to a method and apparatus for efficient synchronization request response.

BACKGROUND AND SUMMARY

Tape drives can be used to store massive amounts of data to magnetic tapes. Magnetic tapes are often used for archival storage, and provide a reasonable cost vs. storage size tradeoff.

Unlike traditional hard disk drives, tapes are written to and read from sequentially. For writing data to a tape, the data can be streamed from a buffer to the tape as a tape spools. The drive may only write and read data while the tape is moving at a constant velocity. In order to attain high average data transfer rates, stopping and starting of tape motion must be kept to a minimum. Although data can be read from and written to a moving tape at high speeds, this stopping and starting of the tape reels can take seconds each time, and in a world where data is transferred at billions of bits per second, a few seconds per direction change can result in significant slowdown.

Additionally, as tape drive transfer rates increased, a problem was encountered wherein there would be, at times, insufficient data streaming to the tape to efficiently write the tape at maximum speed. Accordingly, the tape would have to be stopped backed up, and re-started. Fluctuations in the volume of data being written could cause this to occur repeatedly (speed up the drive for high volume data writing, stop, back up and repeat). This resulting back and forth is known as shoe shining or back-hitch.

To address this problem, larger buffers were added to tape drives. The buffer is typically comprised of volatile memory, and it stores large amounts of data to allow data to efficiently be streamed to a tape. The buffer can receive a reasonable amount of incoming data, and then, when there is sufficient data in the buffer, begin the write process. This prevents shoe shining, or at least reduces the incidences of it.

One example of buffer use is in an archiving process. If data is being streamed to a backup system from numerous sources, the volume of data coming in to be written may vary greatly over time. Further, the delivered volume of data at the delivery speed may exceed the maximum write rate to tape. Accordingly, this data can be stored in buffer until it is written to the drive.

In this type of system, it is not uncommon for the writing entity to receive a synchronization request from the delivering entity. The synchronization request is an instruction that all data presently in the buffer should be written to the tape. To respond positively to this request, i.e., to confirm the synchronization, the writing entity must be sure that all the data in the buffer is written to the tape. Since this process may take some time, however, the drive cannot always immediately confirm the synchronization request. Further, even if the drive intends to write all presently buffered data to the tape, it cannot confirm the request until the write is completed, in case of power failure or some other failure which would wipe the buffer clean.

One solution to this problem is found in IBM's Virtual Backhitch. In this solution, when a synchronization request is received, the drive selects an unused track on the tape presently being written to and then proceeds to rapidly transfer the buffer to tape, respond to the synchronization, and continue moving tape even though there is no new data to write yet. Since tape is still in motion, when more write data is received, it may be written immediately without having to wait for the tape to ramp up to speed making each synchronization response much quicker than if data were not being written in a sparse fashion. Once a sufficient amount of data has been written in a sparse fashion, the system can reposition to the point in the tape where the sparse data starts, and begin writing the data in an efficient compressed fashion, eventually overwriting the back-up version of the data as this process repeats. In the event of a power or other failure prior to the data being compacted in the normal fashion, all the data that was reported as synchronized is written to the tape and can be read back even though it isn't written in the typical fashion.

According to one illustrative embodiment, a method of backing up buffered data from a buffer includes receiving a synchronization request. The method further includes ensuring buffered data corresponding to the synchronization request is stored in one or more non-volatile memory circuits and responding affirmatively to the synchronization request. This non-volatile memory circuit(s) provides a copy of the data that will not be lost in the event of a power or other failure. This memory can include, but is not limited to, flash-backed RAM, EPROM flash memory, and battery-backed RAM.

In another illustrative embodiment, a data storage apparatus comprises a buffer to store data to be written to a tape, a tape drive, in communication with the buffer, to write data from the buffer to a tape, one or more non-volatile memory circuits to store data corresponding to a synchronization request, and a processor to instruct operation of the buffer, tape drive and non-volatile memory circuits. In this illustrative embodiment, upon receipt of the synchronization request, the processor is operable to instruct the buffer to determine if data corresponding the synchronization request is stored in non-volatile memory circuits.

In yet a further illustrative embodiment, a data backup system comprises a requesting device, including at least an outgoing stream of data. The system also includes a backup device. The backup device includes an incoming stream of data corresponding to the outgoing stream of data. The backup device also includes a buffer to store at least a portion of the incoming stream of data and a tape drive to write data stored in the buffer to a tape. Further, the backup device includes one or more non-volatile memory circuits to store back-up versions of data in the buffer.

In this exemplary system, upon detection of a synchronization request included with the incoming stream of data, the backup device is operable to copy data corresponding to the synchronization request from the buffer to the non-volatile memory circuit.

DETAILED DESCRIPTIONS OF ILLUSTRATIVE EMBODIMENTS

Figure 1:
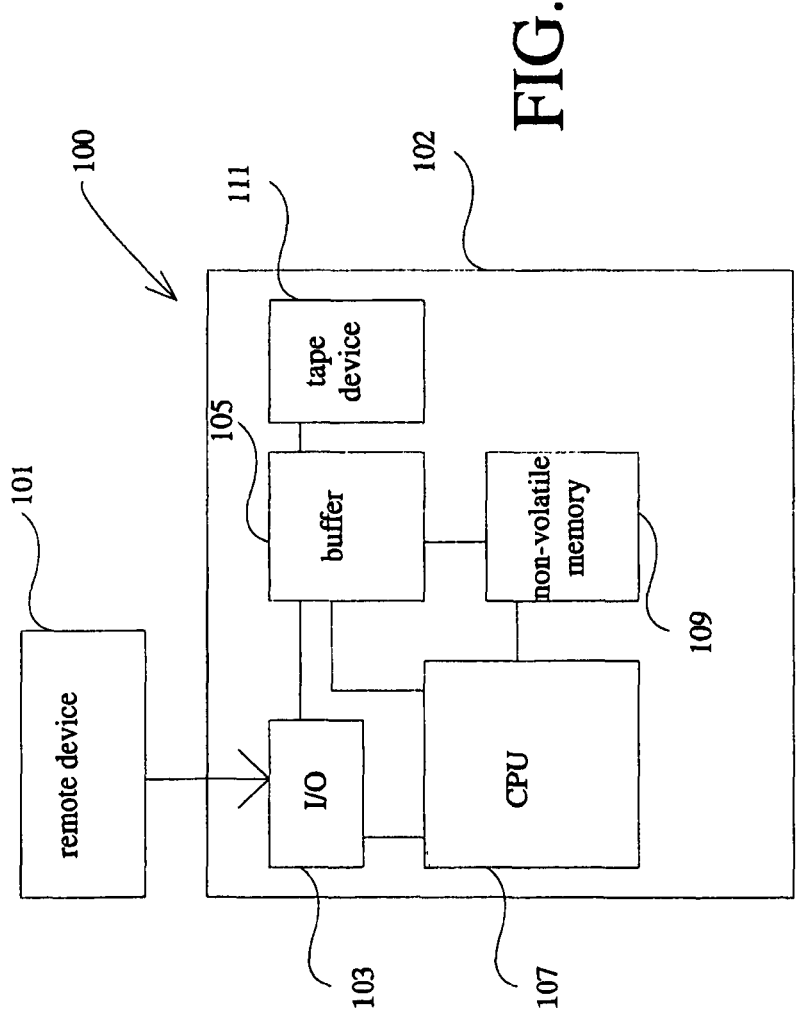
FIG. 1 shows an exemplary illustrative system for practicing the illustrative embodiments.

FIG. 1 shows an exemplary illustrative system 100 for practicing the illustrative embodiments. In this illustrative embodiment, a remote system 101 is sending data to a local system 102 to be written to a tape in a tape drive 111.

Information from the remote system 101 flows to the local system 102 through an I/O connection 103. This connection 103 can be a network connection, a direct connection, etc.

Information can be streamed from the remote system 101 to a buffer 105 to store the information before writing it to a tape in the tape drive 111. Using a buffer 105 may provide a more efficient transfer of data to the tape, since the data may come in spurts. Since the buffer 105 can store the data, the data can be sent from the buffer 105 to the tape drive 111 at constant speeds. This ability to transfer data at a constant speed from the buffer 105 to the tape drive 111 prevents, or at least lessens, the need to constantly shoe shine the tape being spooled in the tape drive 111. Since a large portion of the delays in a tape drive can often be attributed to shoe shine events, use of a buffer 105 can result in a more efficient transfer of data to a tape.

A CPU 107 controls the various components involved in the data transfer and writing process.

In this illustrative embodiment, one or more non-volatile memory 109 are provided in communication with the buffer 105. This memory 109 can be dedicated to the buffer 105, or it can be shared with other system resources. A non-exhaustive list of non-volatile memory sources includes: flash-backed ram, hard disk drives, battery backed ram, etc.

When a synchronization request from the remote system 101 is received, the system is expected to respond with a confirmation that all the data presently in the buffer 105 has been transferred to the tape. Since the system should not respond to the request until it can confirm that this condition is or will assuredly (or at least, with all probability) be met, if there is nothing but a buffer and a tape drive, then the system must wait until the actual write to the tape is complete before affirmatively responding to the synchronization request. The system will not likely send an affirmative response simply because it intends to complete this operation, as a loss of power on the writing system 100 end could result in the loss of data in the buffer. In this event, if the affirmation of the synchronization request had already been sent, the remote system would assume the data had been written, and the local system would no longer have the data to complete the write process.

In this illustrative embodiment, however, one or more non-volatile memory sources 109 are provided to the buffer 105. When a synchronization request is received by the system 100, the CPU 107 can instruct the buffer 105 to write the contents thereof to the non-volatile memory 109. This helps ensure that the data will not be lost in the event of a power failure. In this illustrative embodiment, once the contents of the buffer 105 have been written to the non-volatile memory 109, a positive response is sent to the synchronization request.

Since the non-volatile memory 109 retains its contents even in the event of a power failure, the system 102 can respond to the synchronization request with confidence that it will be fulfilled. Even if a power failure were to occur, the contents of the non-volatile memory 109 could be written back to the buffer 105 and then written to the tape.

Additionally, the write time from the buffer 105 to the non-volatile memory 109 may be faster than writing from the buffer to the tape. This means that the synchronization request can be affirmatively responded to more quickly.

Even if it's possible to swiftly write a buffer to tape, for example, in a sparse fashion such as is done by the virtual backhitch solution, the write from the buffer to the non-volatile memory requires no stopping, starting or reversing of the tape. Thus, such a write may also be faster than a swift, sparse write to the tape.

Figure 2B:
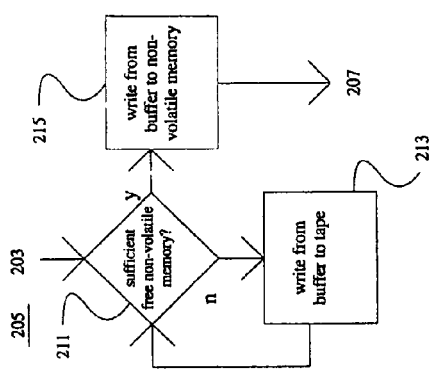
FIG. 2B shows an exemplary illustrative process for writing data to a non-volatile memory from a buffer.
Figure 2C:
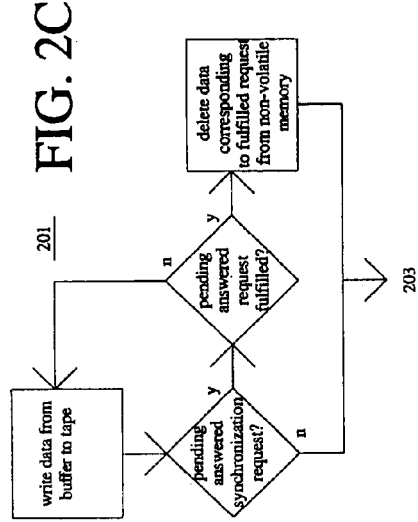
FIG. 2C shows an exemplary illustrative process for streaming data from a buffer to a tape drive for writing.
Figure 2A:
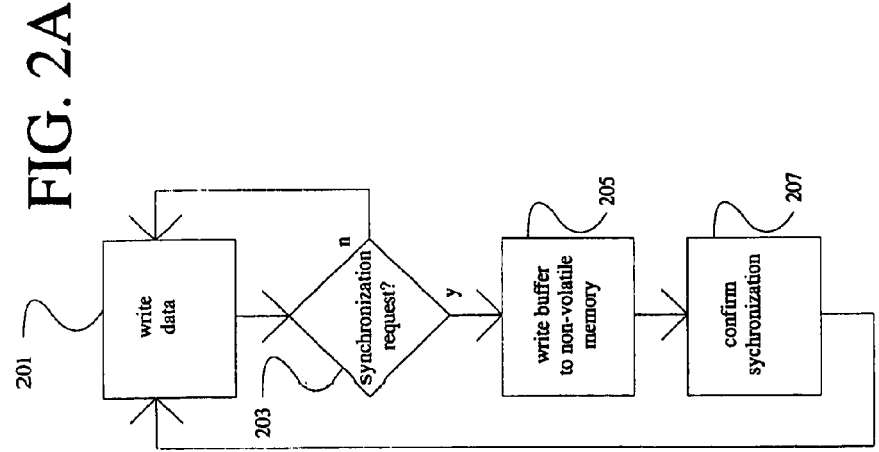
FIG. 2A shows one exemplary illustrative synchronization process.

FIG. 2A shows one exemplary illustrative synchronization process. In this illustrative embodiment, data is written from a buffer to a tape until a synchronization request is received, at which point a system must determine how to respond to the request.

Initially, data is being written from the buffer to the tape 201. The buffer has, in this illustrative embodiment, received data from a remote source and is buffering the data in order to provide a stream of data to the tape drive at a more constant rate of speed.

As long as a synchronization request is not received, the buffer may continue to send data to the tape drive for writing 201. If the buffer is empty (buffer under run) then the sending/writing process may cease, but as long as there is data, it will be sent to the tape drive in this illustrative embodiment.

If a synchronization request 203 is detected, the buffer must decide how to respond to that request. In this illustrative embodiment, the buffer will write the data to the non-volatile memory 205. Since the synchronization command typically instructs the writing of all data in the buffer to the tape, the buffer will typically write all data in the buffer at the time of the command to the non-volatile memory 205 for storage until it can be confirmed that the data has been written to the tape. Another option would be to write all data in the buffer that has been received since the last synchronization command (since data pre-dating that command has presumably been backed up already, this may help avoid redundancy).

Since the data is now safely stored in non-volatile memory, where it will presumably be safe in the event of a power failure, a confirmation to the synchronization request can be sent 207. Even though the data may not actually be written to the tape yet, the confirmation can be sent because the data is stored in a non-volatile location, and can be retrieved and written in the event of a failure.

FIG. 2B shows an exemplary illustrative process for writing data to a non-volatile memory from a buffer. In this illustrative process, the system checks to see if the non-volatile memory has room for the incoming write 211. Since there may be a limited amount of non-volatile memory, or since synchronization requests may come in high volumes, it is possible that the non-volatile memory could fill up. In this event, if the memory does not have room for the upcoming write from the buffer, the system will write data from the buffer to the tape 213 until the memory has room to transfer information from the buffer to the memory. In this embodiment, there is no affirmative response to the synchronization command while this process of reducing buffered data size and/or freeing memory occurs.

Once the data in the buffer can fit into the non-volatile memory (for example, once the data is sufficiently small or there is sufficient room in the memory), the system will write the data 215 from the buffer to the non-volatile memory and proceed to respond affirmatively to the synchronization request.

FIG. 2C shows an exemplary process for streaming data from a buffer to a tape drive for writing. In this illustrative embodiment, the system accounts for confirmed-but-not-completed synchronization requests, referred to as answered requests.

First, some portion of the data in the buffer is streamed to the tape drive for writing to a tape 221. Then, in this illustrative embodiment, the system checks to see if there is an answered request pending 223 (i.e., a request that has been confirmed but not yet fulfilled). If there is no answered request pending, the system continues writing from the buffer to the tape. If there is an answered request pending, then the system checks to see if the most recent stream from the buffer to the tape drive fulfilled that request 225. In other words, the system checks to see if all the data in the buffer when the synchronization request was sent has now been streamed out of the buffer (transferred to the tape, etc.). If the answered request has finally been fulfilled, then the system proceeds to delete the backup information from the non-volatile memory 227. This is because the backup information is no longer needed, and the space in the non-volatile memory can be used for additional storage. If the answered request has not yet been fulfilled, then the system continues on to a next step.

Figure 3:
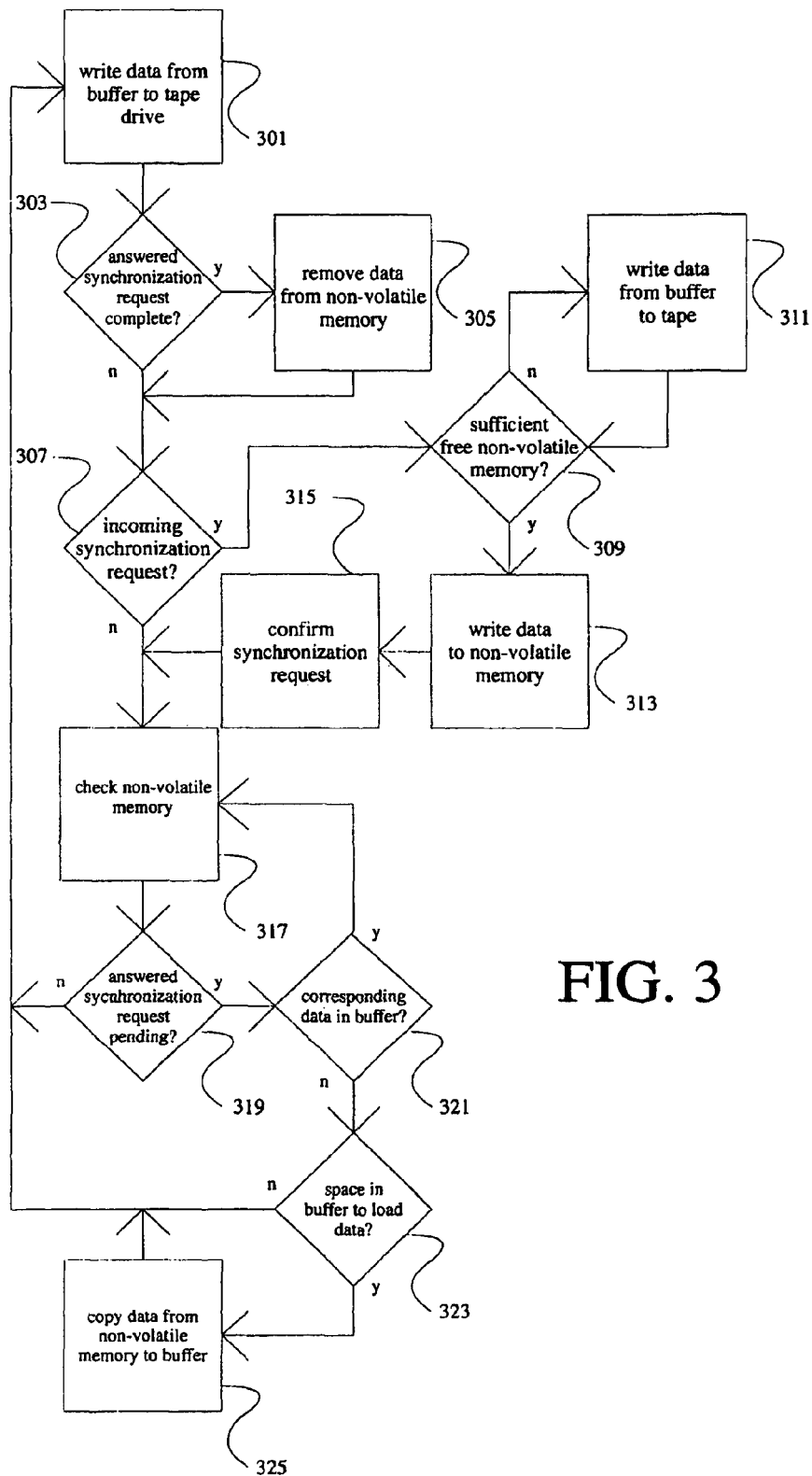
FIG. 3 shows a second exemplary illustrative synchronization process.

FIG. 3 shows a second exemplary illustrative synchronization process 300. Although this is a more detailed process, it is to be appreciated that this and all processes shown herein are provided by way of example only, and are not intended to limit the scope of the invention in any way.

In the illustrative exemplary process 300, the system begins by streaming data from a buffer to the tape drive 301. Next, the system checks to see if any answered synchronization requests have been completed 303. As with respect to FIG. 2C, answered synchronization requests are requests that have been affirmed (e.g., without limitation, a positive response has been sent back to the requesting entity), but have not yet been completed (e.g., without limitation, written to tape, streamed fully from the buffer, etc.). If an answered synchronization request has been completed, then the system proceeds to remove the backup data corresponding to the answered synchronization request from the non-volatile memory 305.

If the answered synchronization request has not been completed (or if there are no answered synchronization requests to be completed), the system checks for any incoming synchronization requests 307. Incoming synchronization requests could be a new synchronization request or a synchronization request that has not yet been confirmed (e.g., without limitation, a synchronization request pending in a request buffer).

If there is at least one incoming synchronization request, the system checks to see if there is space in the non-volatile memory to store the data corresponding to the synchronization request 309 (e.g., without limitation, all the data since the last synchronization request, all the data in the buffer, etc.). If there is not room in the non-volatile memory to store the data corresponding to the synchronization request, the system proceeds to stream data from the buffer 311 to the tape for writing, checking periodically to see if there is room in the non-volatile memory to store the data corresponding to the synchronization request 309.

For example, if there was 300 MB of non-volatile memory available, and the size of the data corresponding to a synchronization request arrived was 300 MB, the system would enter the above process. After 100 MB of data has been streamed from the buffer, it may be the case that this streamed data corresponds to a previous synchronization request, and could thus be deleted from the non-volatile memory (where it is backed up), leaving 200 MB of space in the non-volatile memory. Once 100 MB of the data corresponding to the synchronization request had also been streamed from the buffer, there would be 200 MB of data remaining in the buffer corresponding to the not-yet-answered synchronization request. Additionally, there would be 200 MB of space in the non-volatile memory. At this point, the data could be written to the non-volatile memory 313. Once the data has been written to the non-volatile memory, the synchronization request is confirmed 315.

In this illustrative embodiment, a check is also made for a condition wherein power may have been lost at some previous time. The system checks the non-volatile memory to see if there are any answered synchronization requests pending 317. If there is at least one answered synchronization request pending in the non-volatile memory 319, the system then checks to see if data corresponding to the answered synchronization request is also in the buffer 321 (i.e., pending writing). If so, the system continues checking for additional answered synchronization requests in the non-volatile memory, to find out if there are any pending requests which have not been completed but have been wiped from the buffer.

If there is an answered synchronization request in the non-volatile memory that does not have the corresponding data also waiting in the buffer, the system checks to see if there is room in the buffer for the corresponding data 323. If there is not room, the system continues on, and will address the request on a later cycle when there is room. Of course, other suitable solutions are possible. For example, without limitation, the system could wait at this point and stream data from the buffer to the tape drive until there is sufficient room to transfer the data from the non-volatile memory to the buffer.

If there is room in the buffer to store the data in the non-volatile memory corresponding to the answered synchronization request, the system copies the data from the non-volatile memory to the buffer 325. This places the data back in the buffer so that it can be written to the tape following a power failure or other event where the data was inadvertently cleared from the buffer.

The invention claimed is:

1. A method of backing up buffered data in a buffer, comprising:
   receiving a synchronization request;
   responding affirmatively to the synchronization request;
   ensuring buffered data corresponding to the synchronization request is stored in at least one non-volatile memory circuit;
   determining if the non-volatile memory circuit has sufficient space to store buffered data corresponding to the synchronization request; and
   if the non-volatile memory circuit lacks sufficient space to store the buffered data corresponding to the synchronization request, writing buffered data from the buffer to a tape, at least a portion of the buffered data corresponding to the synchronization request, until remaining data corresponding to the synchronization request is of sufficient size to be stored in the non-volatile memory.

2. The method of claim 1, wherein the non-volatile memory circuit comprises flash-backed RAM.

3. The method of claim 1, wherein the non-volatile memory circuit comprises battery backed ram.

4. The method of claim 1, wherein the ensuring step further includes copying the data to non-volatile memory circuit.

5. The method of claim 4, wherein the non-volatile memory circuit comprises EPROM flash memory.

6. The method of claim 1, further including:
   storing at least one answered synchronization request in the non-volatile memory circuit.

7. The method of claim 6, further including:
   retrieving at least one answered synchronization request from the non-volatile memory circuit;
   determining if data corresponding to the retrieved answered synchronization request is in the buffer; and
   if data corresponding to the retrieved answered synchronization request is not in the buffer, copying data corresponding to the retrieved answered synchronization request from the non-volatile memory circuit to the buffer.

8. The method of claim 7, further including:
determining if there is sufficient space in the buffer to receive data corresponding to the retrieved answered synchronization request; and
if there is insufficient space in the buffer to receive data corresponding to the retrieved answered synchronization request, copying data from the buffer to a tape until there is sufficient space in the buffer to receive data corresponding to the retrieved answered synchronization request, wherein the step of copying data corresponding to the retrieved answered synchronization request from the non-volatile memory circuit to the buffer only occurs after there is sufficient space in the buffer to receive data corresponding to the retrieved answered synchronization request.

9. A data storage apparatus comprising:
a buffer to store data to be written to a tape;
a tape drive, in communication with the buffer, to write data from the buffer to a tape;
one or more non-volatile memory circuits to store data corresponding to a synchronization request; and
a processor configured to instruct operation of the buffer, tape drive and non-volatile memory circuit, wherein, upon receipt of the synchronization request, the processor is configured to determine if the data stored in the buffer is stored in the one or more non-volatile memory circuits;
wherein the processor is further configured to determine if the non-volatile memory circuit has sufficient space to store buffered data corresponding to the synchronization request;
wherein the processor is further configured to instruct writing buffered data from the buffer to the tape, at least a portion of the buffered data corresponding to the synchronization request, until remaining unwritten data corresponding to the synchronization request is of sufficient size to be stored in the non-volatile memory, if the non-volatile memory circuit lacks sufficient space to store the buffered data corresponding to the synchronization request.

10. The apparatus of claim 9, wherein the processor is configured to instruct deletion of the data corresponding to the synchronization request from the non-volatile memory circuit after said data is written from the buffer to the tape.

11. The apparatus of claim 9, wherein the one or more non-volatile memory circuits further include flash-backed RAM.

12. The apparatus of claim 9, wherein the one or more non-volatile memory locations further include battery-backed RAM.

13. The apparatus of claim 9, wherein the processor is further configured to instruct the buffer to write data stored thereon corresponding the synchronization request to the non-volatile memory circuit.

14. The apparatus of claim 9, wherein the one or more non-volatile memory locations further include EPROM flash memory.

15. The apparatus of claim 9, wherein the processor is configured to instruct storage of at least one answered synchronization request in the non-volatile memory circuit.

16. The apparatus of claim 15, wherein the processor is configured to instruct retrieval of at least one answered synchronization request from the non-volatile memory circuit;
wherein, the processor is configured to determine if data corresponding to the retrieved answered synchronization request is in the buffer; and
wherein the processor is configured to instruct copying of data corresponding to the retrieved answered synchronization request from the non-volatile memory circuit to the buffer, if data corresponding to the retrieved answered synchronization request is not in the buffer.

17. The apparatus of claim 15, wherein the processor is configured to determine if there is sufficient space in the buffer to receive data corresponding to the retrieved answered synchronization request; and
wherein the processor is configured to instruct copying data from the buffer to a tape until there is sufficient space in the buffer to receive data corresponding to the retrieved answered synchronization request, if there is insufficient space in the buffer to receive data corresponding to the retrieved answered synchronization request.

18. A data backup system comprising:
a requesting device, comprising at least an outgoing stream of data;
a backup device, comprising:
an incoming stream of data corresponding to the outgoing stream of data;
a buffer to store at least a portion of the incoming stream of data;
a tape drive to write data stored in the buffer to a tape; and
one or more non-volatile memory locations to store back-up versions of data in the buffer; wherein, upon detection of a synchronization request included with the incoming stream of data, the backup device is configured to ensure that data corresponding to the synchronization request is stored in the one or more non-volatile memory locations,
wherein the back-up device is further configured to determine if the non-volatile memory circuit has sufficient space to store buffered data corresponding to the synchronization request,
wherein the back-up device is further configured to write buffered data from the buffer to the tape, at least a portion of the buffered data corresponding to the synchronization request, until remaining unwritten data corresponding to the synchronization request is of sufficient size to be stored in the non-volatile memory, if the non-volatile memory circuit lacks sufficient space to store the buffered data corresponding to the synchronization request.

* * * * *